(12) United States Patent
Hirth et al.

(10) Patent No.: US 9,231,722 B2
(45) Date of Patent: Jan. 5, 2016

(54) MULTI-PORT CHANNELIZED OPTICAL LINE TERMINAL

(71) Applicant: BROADCOM CORPORATION, Irvine, CA (US)

(72) Inventors: Ryan Hirth, Windsor, CA (US); Sourigno Outsama, Santa Rosa, CA (US); Ngo Ho, Arlington, TX (US); Simon Ray Lee, Petaluma, CA (US)

(73) Assignee: BROADCOM CORPORATION, Irvine, CA (US)

( * ) Notice: Subject to any disclaimer, the term of this patent is extended or adjusted under 35 U.S.C. 154(b) by 357 days.

(21) Appl. No.: 13/780,125

(22) Filed: Feb. 28, 2013

(65) Prior Publication Data

US 2014/0212128 A1    Jul. 31, 2014

Related U.S. Application Data

(60) Provisional application No. 61/757,351, filed on Jan. 28, 2013.

(51) Int. Cl.
*H04L 29/06* (2006.01)
*H04L 25/05* (2006.01)
*H04J 3/16* (2006.01)

(52) U.S. Cl.
CPC .................................. *H04J 3/1694* (2013.01)

(58) Field of Classification Search
CPC ............ H04L 49/30; H04L 2012/5614; H04L 5/0064; H04L 49/15; H04L 29/06; H04L 47/10; H04L 25/05
See application file for complete search history.

(56) References Cited

U.S. PATENT DOCUMENTS

| | | | | |
|---|---|---|---|---|
| 6,108,306 | A | * | 8/2000 | Kalkunte et al. ............... 370/235 |
| 6,108,726 | A | * | 8/2000 | Runaldue et al. ............... 710/62 |
| 7,522,614 | B1 | * | 4/2009 | Aguinaga et al. ............. 370/401 |
| 2003/0016416 | A1 | * | 1/2003 | Wolf ............................. 359/139 |
| 2006/0228113 | A1 | * | 10/2006 | Cutillo et al. ................... 398/71 |
| 2009/0022494 | A1 | * | 1/2009 | Yang ............................... 398/63 |
| 2009/0208210 | A1 | * | 8/2009 | Trojer et al. .................... 398/58 |
| 2010/0183022 | A1 | * | 7/2010 | Berman ......................... 370/419 |
| 2010/0260498 | A1 | * | 10/2010 | Kim et al. ....................... 398/45 |
| 2011/0116803 | A1 | * | 5/2011 | Sone et al. ...................... 398/98 |
| 2011/0229131 | A1 | * | 9/2011 | Izenberg et al. ............... 398/45 |
| 2012/0121265 | A1 | * | 5/2012 | Suvakovic et al. ............. 398/66 |
| 2013/0011142 | A1 | * | 1/2013 | Goodson et al. ............... 398/98 |

* cited by examiner

*Primary Examiner* — Chiho Lee
(74) *Attorney, Agent, or Firm* — Garlick & Markison; Randy W. Lacasse (57) ABSTRACT

A method and system for channelizing a Passive Optical Network (PON) Media Access Controller (MAC) includes increasing a clock rate of each of one or more PON MAC(s) to create communication lanes each comprising a plurality of N channels. The PONs are channelized according to NX, where N equals a number of ports supported by the MAC and X equals a designated operating PON MAC clocking rate allowing for leveraging of existing Passive Optical Network (PON) infrastructures to provide a more power efficient and physically smaller MAC layer for OLTs.

20 Claims, 6 Drawing Sheets

MULTI-PORT CHANNELIZED OPTICAL LINE TERMINAL

CROSS-REFERENCE TO RELATED APPLICATIONS/INCORPORATION BY REFERENCE

The present U.S. Utility patent application claims priority pursuant to 35 U.S.C. §119(e) to U.S. Provisional Application Ser. No. 61/757,351, entitled "Multi-Port Channelized Optical Line Terminal," filed Jan. 28, 2013, pending, which is hereby incorporated herein by reference in its entirety and made part of the present U.S. Utility patent application for all purposes.

BACKGROUND OF THE INVENTION

1. Technical Field of the Invention

The technology described herein relates generally to high-capacity communication networks. More specifically, the technology relates to optical networks.

2. Description of Related Art

Increasing network traffic in communication backbone networks has recently resulted in the need to upgrade the current infrastructure. Tremendous growth in network traffic requirements has increased the need for a high-capacity network backbone between service providers and subscribers. One solution to the increased traffic requirements is provided by Passive Optical Networks (PONs). PONs support an inexpensive, simple, scalable system that leverages the existing, low-cost Ethernet technology with optic network architecture.

A PON is a single, shared optical fiber that uses optical splitters to divide the single fiber into separate fibers feeding individual subscribers. Each subscriber has a dedicated fiber that converges together with other subscriber fibers at a common site where they share an Optical Distribution Network (ODN) trunk fiber back to a central location. By incorporating optical splitters, the need for electrical equipment is eliminated. Additionally, the amount of fiber required for PON configurations is less than that of traditional point-to-point topological networks.

Standard PON configurations involve a passive connection between an optical line terminal (OLT) coupled to a network and a plurality of optical network units (ONU). Data is transferred from the OLT to ONU through a single, shared fiber. Passive optical splitters (POS) located downstream of the OLT feed the data to a plurality of ONUs that are coupled to individual subscribers.

A PON apparatus typically consists of an upstream network media access control (MAC) port at the OLT adapted to transmit/receive data to/from the upstream network. The upstream MAC port provides MAC and physical coding sublayer (PCS) functions. Compatibility of the transmitted frames between the OLT and the ONU is achieved through a Logical Link Identification (LLID). The LLID identifies a flow to an ONU using an 8 byte preamble of the Ethernet frame that is attached during transmission of the data from the OLT. A second MAC port is provided at the ONU connected to the physical interface and configured to process frames transmitted from the OLT.

Figure 1:
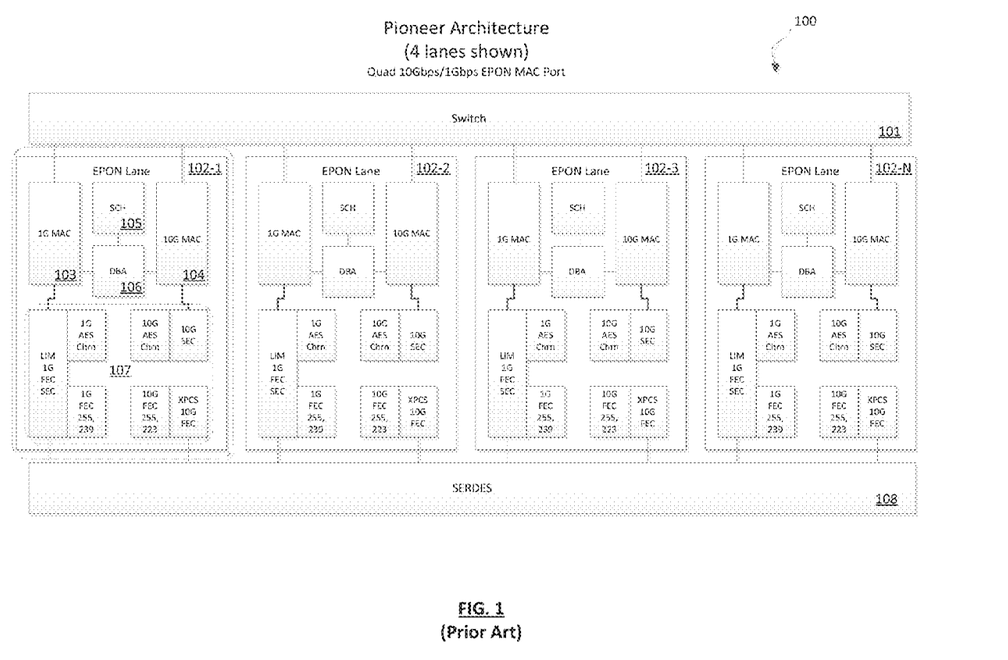
FIG. 1 is a schematic block diagram of a Quad 10 Gbps/1 Gbps EPON MAC port.

Media Access Control elements are required at both ends of the network. A PON MAC provides data processing capabilities, management features and quality of service (QOS) functions. They are typically instantiated on a per port basis such that an octal port device has 8 instances of the MAC. FIG. 1 illustrates an example of an Ethernet PON (EPON) OLT 100 featuring a quad 10 Gbps/1 Gbps port having switch 101 in connection with lanes 102-1-102-N. Each lane consists of at least a 1 Gbps MAC 103, a 10 Gbps MAC 104 and scheduler (SCH) 105 connected to dynamic bandwidth allocator (DBA) 106. Each lane also contains the necessary PCS components 107 (e.g., line interface modules, advance encryption standard chip(s) (e.g., China Telecom Triple Churning Encryption), forward error correction (FEC) such as 1G, 10G and physical coding sublayer (XPCS) for encoding and processing individual data streams. Inputs/Outputs (I/O) from the EPON lanes are transferred using, for example, using serializer/deserializer (SERDES) 108.

A serializer/deserializer (SERDES) converts data between serial data and parallel interfaces in each direction. The term "SERDES" generically refers to interfaces used in various technologies and applications. The basic SERDES function is made up of two functional blocks: a Parallel In, Serial Out (PISO) block (aka Parallel-to-Serial converter) and a Serial In, Parallel Out (SIPO) block (aka Serial-to-Parallel converter).

The PISO (Parallel Input, Serial Output) block typically has a parallel clock input, a set of data input lines, and input data latches. It may use an internal or external Phase-locked loop (PLL) to multiply the incoming parallel clock up to the serial frequency. The simplest form of the PISO has a single shift register that receives the parallel data once per parallel clock, and shifts it out at the higher serial clock rate. Implementations may also have a double-buffered register.

The SIPO (Serial Input, Parallel Output) block typically has a receive clock output, a set of data output lines and output data latches. The receive clock may have been recovered from the data by the serial clock recovery technique. However, SERDES which do not transmit a clock use reference clock to lock the PLL to the correct Tx frequency, avoiding low harmonic frequencies present in the data stream. The SIPO block then divides the incoming clock down to the parallel rate. Implementations typically have two registers connected as a double buffer. One register is used to clock in the serial stream, and the other is used to hold the data for the slower, parallel side. Such serializer encoder and deserializer decoder blocks are generally defined in the Gigabit Ethernet specification.

Although effective, the EPON OLT described above occupies a large physical space and consumes a relatively large amount of power. The technology described herein provides for a channelized MAC that can support 4 ports while substantially reducing the area of the EPON MAC.

The following IEEE standards/draft standards, as well as any additional standards described herein, are hereby incorporated herein by reference in their entirety and are made part of the present U.S. Utility patent application for all purposes:

1. IEEE Stds 802.3##™ (generically), "IEEE Standard for Information technology—IEEE 802.3 is a working group and a collection of IEEE standards produced by the working group defining the physical layer and data link layer's media access control (MAC) of wired Ethernet. This is generally a local area network technology with some wide area network applications. Physical connections are made between nodes and/or infrastructure devices (hubs, switches, routers) by various types of copper or fiber cable. 802.3 is a technology that supports the IEEE 802.1 network architecture. 802.3 also defines LAN access method using CSMA/CD.
2. IEEE Std 802.3ah™, "IEEE Standard for Information Technology—IEEE 802.3ah defines Multi-Point Control Protocol (MPCP), Point-to-Point Emulation (P2PE), and two 1490/1310 nm PMDs for 10 and 20 km, required to build an EPON system.

3. IEEE Std 802.3av™, "IEEE Standard for Information Technology—IEEE 802.3av defines 10 Gbit/s Ethernet Passive Optical Network. The standard supports two configurations: symmetric, operating at 10 Gbit/s data rate in both directions, and asymmetric, operating at 10 Gbit/s in the downstream direction and 1 Gbit/s in the upstream direction.

Disadvantages of conventional approaches will be evident to one skilled in the art when presented in the disclosure that follows.

DETAILED DESCRIPTION OF THE INVENTION

The technology described herein is directed to an apparatus and methods of operation that are further described in the following Brief Description of the Drawings and the Detailed Description of the Invention. Other features and advantages will become apparent from the following detailed description made with reference to the accompanying drawings.

Ethernet Passive Optical Networking (EPON) silicon and software solutions are, for example, focused on access network applications for the Fiber to the X (FTTX) market, supporting EPON at, but not limited to, 1 Gbps and 2 Gbps speeds. FTTX is a generic term for any broadband network architecture using optical fiber to replace all or part of the usual metal local loop used for last-mile telecommunications. The term is a generalization for several configurations of fiber deployment, ranging from FTTN (fiber to the neighborhood) to FTTD (fiber to the desk). Typical uses include, but are not limited to, enabling service providers and carriers to deliver residential broadband, voice, and IPTV services, enterprise services such as voice, TDM, and Internet connectivity, as well as 2.5G, 3G, and 4G cellular backhaul transport services.

Figure 2:
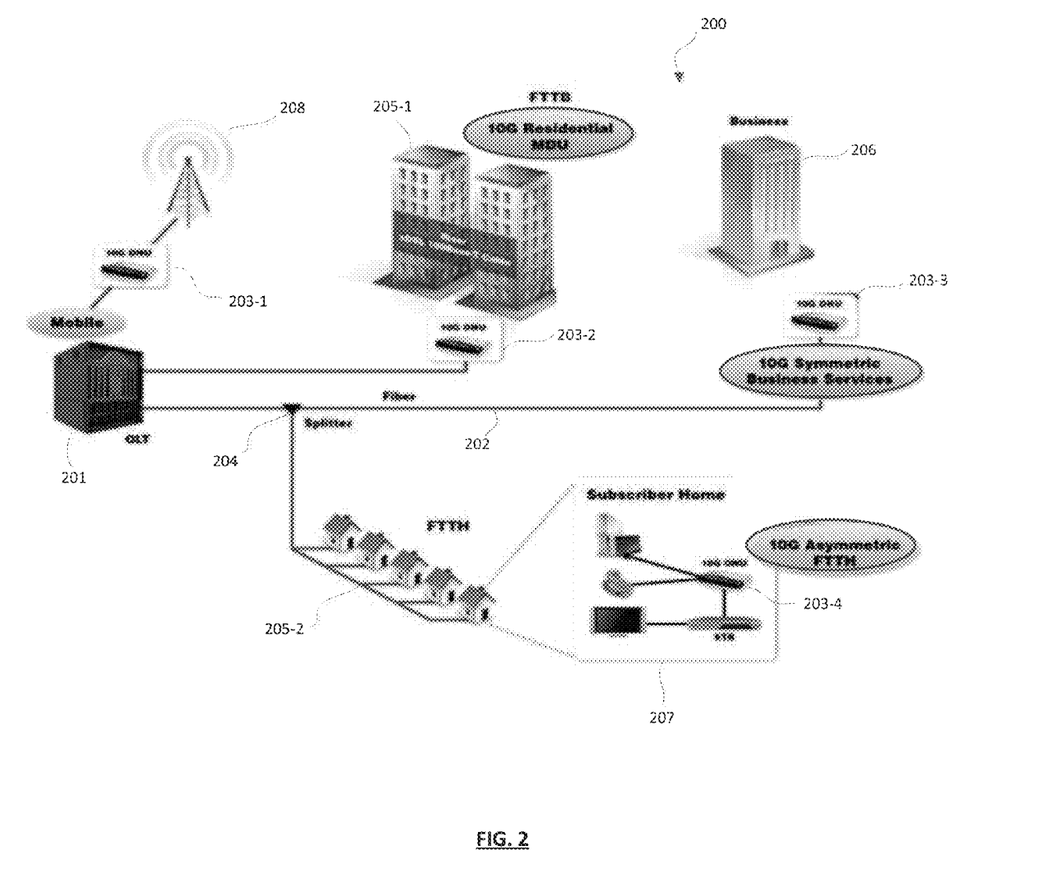
FIG. 2 is a system diagram of an EPON MAC communications environment.

FIG. 2 is a system diagram of one embodiment of an EPON MAC fiber network deployment 200. As shown, PON configurations typically involve a passive connection between an optical line terminal (OLT) 201 coupled to a fiber network and a plurality of optical network units (ONU) 203-1, 203-2, 203-3 and 203-4. Data is transferred from OLT 201 to the various ONUs (203-1, 203-2, 203-3 and 203-4) through a single, shared fiber 202. Passive optical splitters (POS) 204 located downstream of the OLT feed the data to a plurality of ONUs, for example, 203-4 that are coupled to individual subscribers.

Residential (205-1 and 205-2)) and commercial (i.e., enterprise and business services (206)) subscriber services utilize EPON solutions for both central office and customer premises equipment 207 (e.g., computers, telephones, and televisions). Low-cost EPON connectivity with unique traffic management capabilities inexpensively shape and manage services at the edge of the operator's network reducing capital and operation expenditures. Through the use of multiple "logical links" (LLIDs) per end-user device, various EPON solutions support and manage Service Level Agreements (SLAs) on a per-service, per-customer basis, in much the same way Data Over Cable Service Interface Specification (DOCSIS) systems operate today. Commercial clients 206 represent an attractive and stable market for access network providers who can support their mission-critical voice, data, and TDM connectivity requirements. Fixed-line carriers need access network options in order to competitively serve business-services customers while alternative carriers eye the market as an opportunity to create differential advantage with new service bundles.

Voice communications may be carried over Voice over Internet Protocol (VoIP) or time-division multiplexing (TDM) circuits that connect the Public Switched Telephone Network (PSTN) to local Private Branch Exchanges (PBXs). EPON is a transport network for TDM connectivity based on economics, performance, and application flexibility. High-performance Internet connectivity is also very important. Service providers need to meet service level agreements (SLAs), assuring clients that their traffic will be unaffected by other's and that quality of service metrics are maintained. Alternatively, mobile systems connected through, for example, a 10G ONU 203-1 may transmit/receive voice/data over a radio-based network (e.g., cellular network 208) using known cellular standard protocols.

Referring to FIG. 2, fiber-to-the-building (FTTB), multi-dwelling unit (MDU) 205-1, connections to the network enables carriers and OEMs to easily upgrade existing equipment deployed over today's EPON networks (e.g., 1G) and deliver services on the same optical fiber, thus significantly improving carrier profitability and return on investment. For fiber-to-the-home (FTTH) 205-2 applications, the technology described herein empowers next generation digital homes to benefit from new ultra-high-speed latency sensitive services, such as three-dimensional television (3D TV) and interactive Internet gaming, elevating the consumer broadband experience to the next level.

Embodiments of the technology described herein leverage PON infrastructures to provide a more power efficient and physically smaller MAC layer for OLTs. In particular, a multi-port, channelized OLT is provided.

Figure 3:
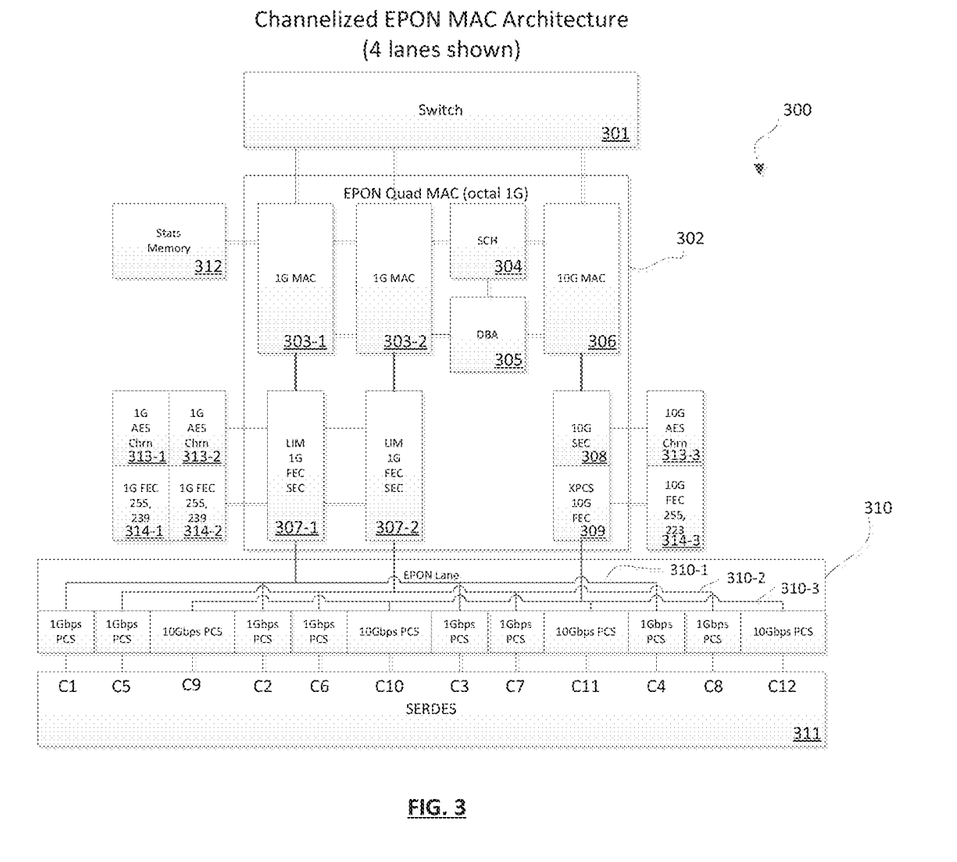
FIG. 3 is a schematic block diagram of a channelized Quad 10 Gbps/1 Gbps EPON MAC port according to the technology described herein.

FIG. 3 shows one embodiment of a multi-port channelized OLT. The block diagram illustrates EPON MAC architecture with 4 lanes shown. In particular, EPON MAC OLT 300 comprises switch 301 in connection with channelized Quad EPON MAC 302. Switch 301 selects between various speed MACs as needed. Quad EPON MAC 302 includes low-speed and high-speed data processing, for example, two low-speed data flows through two 1 Gbps EPON MACs (303-1 and 303-2) as well as a high-speed data flow utilizing 10 Gbps EPON MAC 306. Packet statistics are collected by statistics (stats) memory 312.

While shown as 2 low-speed and 1 high-speed MACs, in alternate embodiments, the number and type of MACs can include any configuration of same speed, multiple speed, and/or variable speed MACs and is not limited to the example embodiment 4 lanes. 1 Gbps EPON MACs 303-1 and 303-2, as well as 10 Gbps EPON MAC 304, are connected to scheduler 304 to direct proper data flows and also connect to dynamic bandwidth allocator (DBA) 305 for proper bandwidth allocation. EPON MACs 303-1 and 303-2 connect to line interface modules 307-1 and 307-2 providing security (SEC) and Forward Error Correction (FEC) for data flows. Error corrected data packets flow from line interface modules 307 to associated Physical Coding Sublayers (PCSs) in EPON lane 310. 10 Gbps EPON MAC 306 is connected to second 10 Gbps EPON MAC 308 that is connected to 10 Gbps PHY 309. In one embodiment, compatibility of EPON OLT 300 with Gigabyte Passive Optical Networks (GPON) and 10-Gigabyte Passive Optical Networks (XGPON) is achieved through a plurality of multiplexers (Mux) (not shown) feeding information such as stats (312), timing, encryption (e.g., advanced encryption Standard 128b (AES-128) and/or China Telecom Triple Churning (Chrn) such as AES Chrn (313-1, 313-2 and 313-3)), error correction/encoding (e.g., FEC 314-1, 314-2 and 314-3), etc. in/out of Quad EPON MAC 302. Serializer/Deserializer (SERDES) 311 interfaces with the PCS. Four lane MACs are formed using channelization (e.g., 4 to 1) to include four PCSs from/to each of three MACs (303-1, 303-2 and 306) from/to 12 PCSs of the SERDES 311 that communicate the data over the trunk line to downstream ONUs. For example, 1G MAC 203-1 data packet flow includes using lane 310-1 which includes four channels C1-C4; 1G MAC 203-2 data packet flow includes using lane 310-2 which includes four channels C5-C8, and 10 Gbps EPON MAC 304 data packet flow includes using lane 310-3 which includes four channels C9-C12.

While a number of low and high speed MACs have been illustrated in this embodiment, any combination of same or differing speed/type MACs can be implemented with a varying number of lanes without departing from the scope of the technology described herein. Please note that flow has been discussed in a single direction, but it is understood that this figure and associated discussion represents a bi-directional flow and processing.

Figure 4:
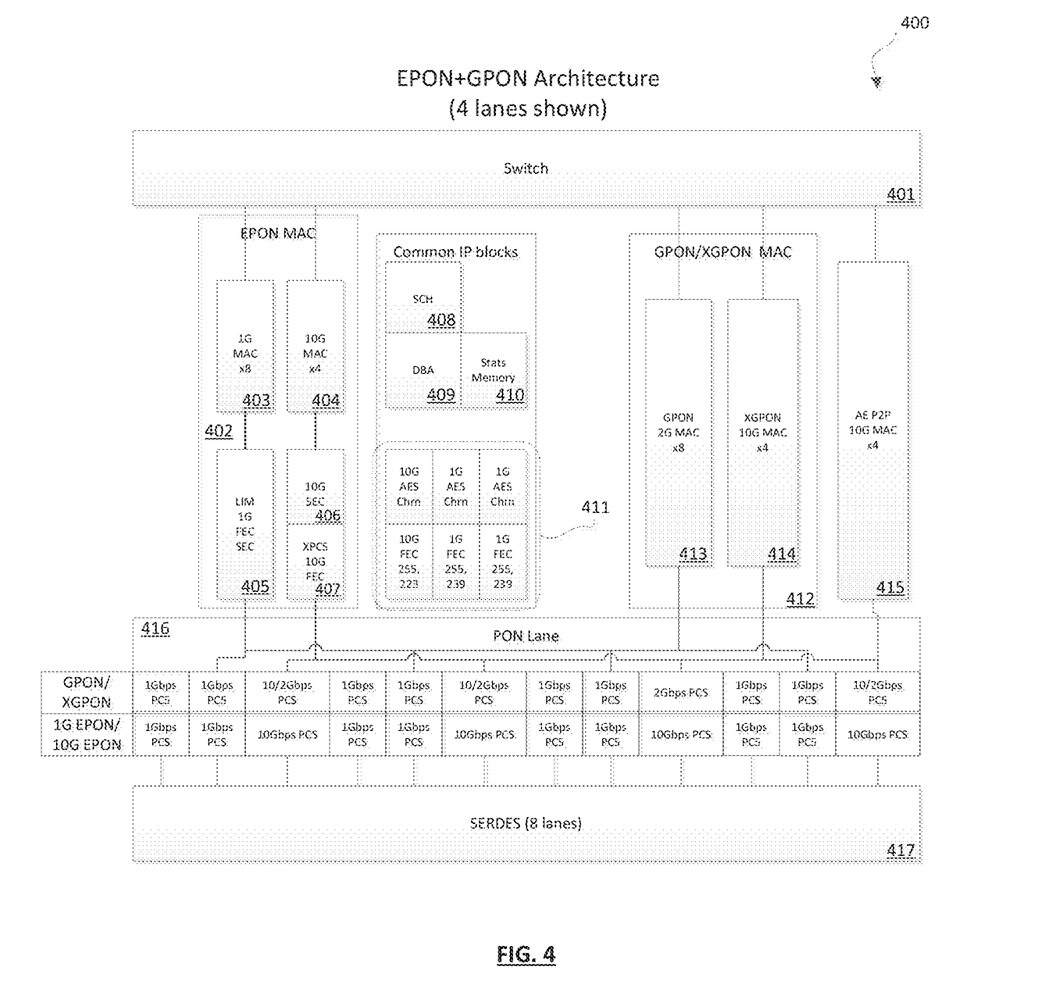
FIG. 4 is a schematic block diagram of an EPON+GPON MAC port according to the technology described herein.

FIG. 4 is a schematic block diagram of an alternative embodiment illustrating EPON/GPON MAC OLT 400 in accordance with the technology described herein. Switch 401 is connected to multiple speed/type communication channel MACs. Looking at the figure from left-to-right, EPON MAC 402 includes both a low-speed EPON MAC, for example, a 1 Gbps EPON MAC (8 lane) 403 and a high-speed EPON MAC, for example, 10 Gbps EPON MAC (10G MAC-4 lane) 404. 1 Gbps EPON MAC 403 is connected through line interface modules (LIM) 405 (providing security (SEC) and Forward Error Correction (FEC)) to/from one of a plurality of PCSs in PON lane 416. Likewise, 10 Gbps EPON MAC 404 is connected to 10 Gbps error correction/encoding elements 406/407 providing security (SEC) and Forward Error Correction (FEC) for data flowing to/from 10 Gbps PCS 407. Please note, various known and future encryption methods are not outside the scope of the technology described herein. Switch 401 is also connected to GPON/XGPON MAC 412 which includes low-speed GPON 2G MAC (8 lane) 413 and high-speed XGPON 10G MAC (4 lane) 414 that connect to/from one of a plurality of PCSs in PON lane 416. EPON MAC 402 and GPON/XGPON MAC 412 share common IP blocks including, but not limited to: scheduling (SCH) 408, dynamic bandwidth allocator (DBA) 409, Stats Memory 410, encryption and error correction/encoding 411 (e.g., advanced encryption Standard 128b (AES-128) and/or China Telecom Triple Churning (Chrn) such as AES Chrn and error correction/encoding 1G/10G FEC). Please note, various known and future encryption/error correction methods are not outside the scope of the technology described herein. PCSs in PON lanes 416 are connected (interface) to/from SERDES 417 according to the number of channelized lanes implemented by each MAC. And finally, Point-to-Point (P2P) Active Ethernet (AE) 10G MAC (4 lane) 415 is also connected to switch 401 and the plurality of PCS' in PON lane 416. As with the other MACs, Point-to-Point (P2P) Active Ethernet (AE) 10G MAC (4 lane) 415 shares common IP blocks 408-411.

While a number of low and high speed MACs have been illustrated in this embodiment, any combination of same or differing speed/type MACs can be implemented with a varying number of lanes without departing from the scope of the technology described herein. Please note that flow has been discussed in a single direction, but it is understood that this figure and associated discussion represents a bi-directional flow and processing.

Figure 5:
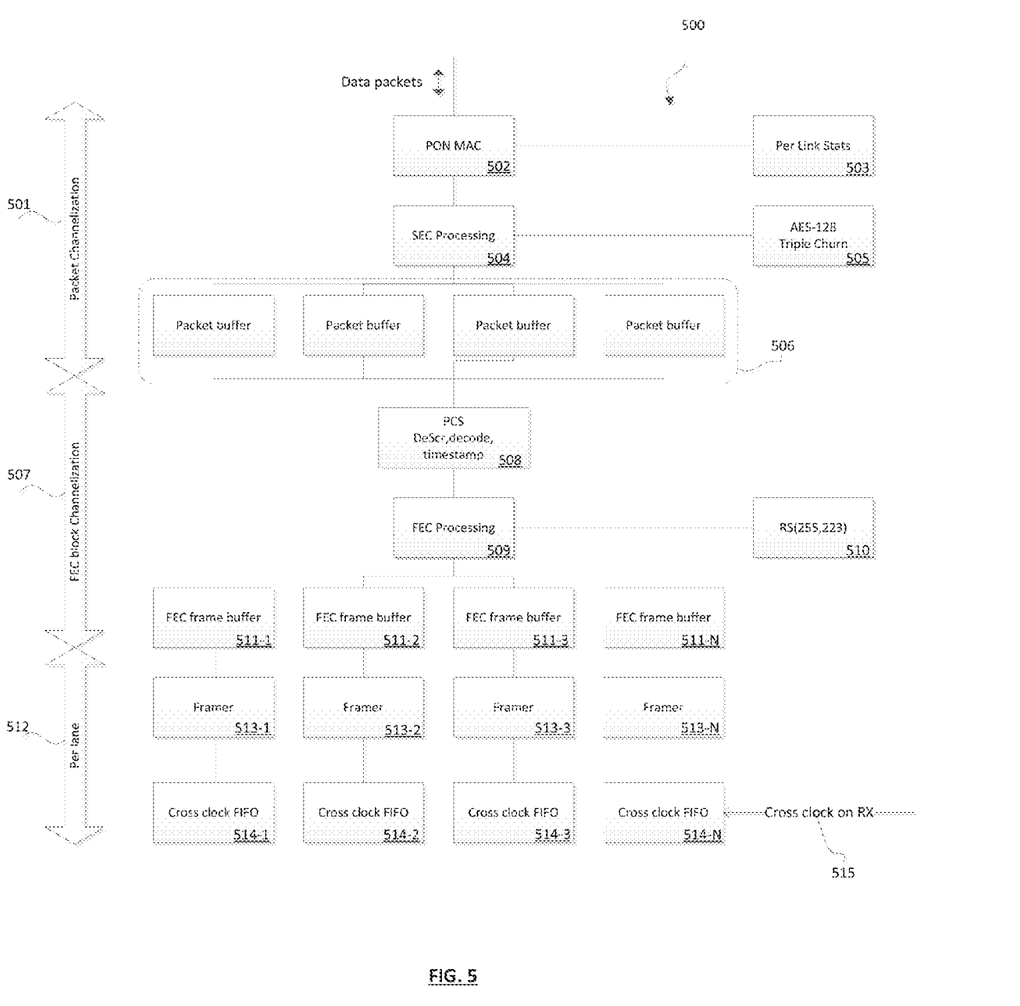
FIG. 5 is a logic diagram of a channelized PON MAC with packet and FEC block channelization according to the technology described herein.
Figure 6:
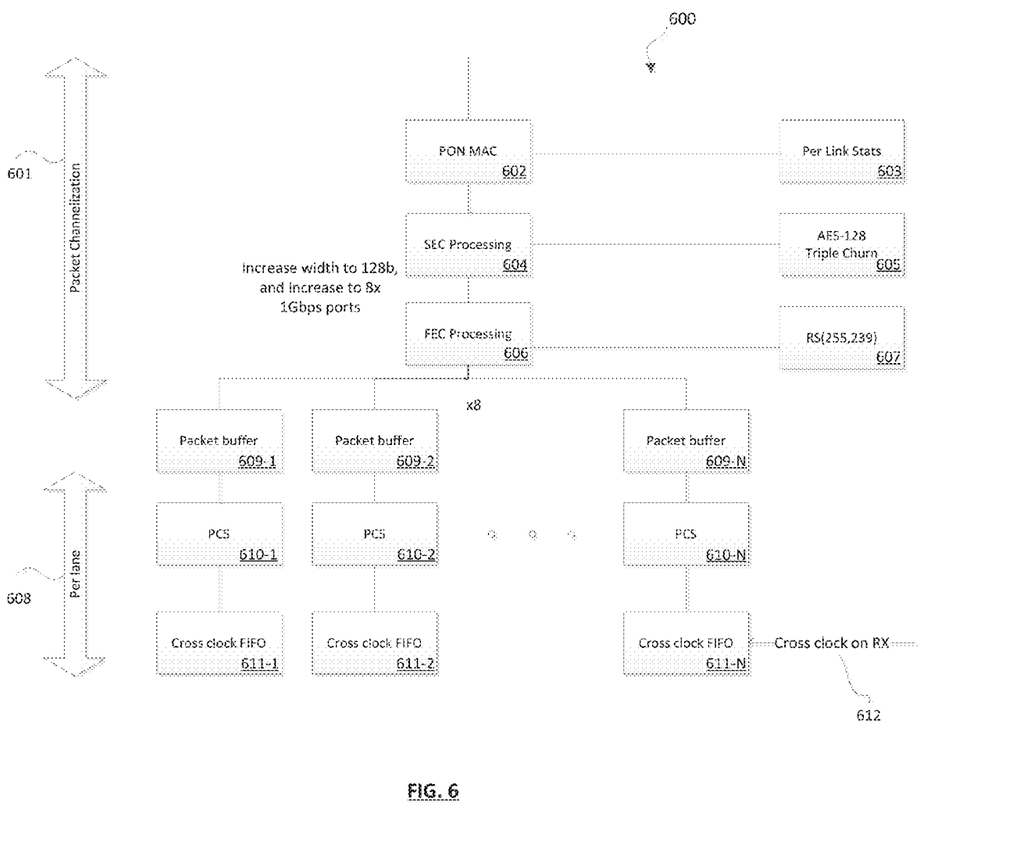
FIG. 6 is a logic diagram of a channelized PON MAC with packet channelization according to the technology described herein.

FIGS. 5 and 6 will provide greater details of channelization steps which, in one embodiment, occur in multiple stages such that receiving the FEC may be channelized on a per FEC code block, while the security (SEC) and MAC may operate on a per frame basis. Channelization occurs by increasing an EPON MAC clock rate according to NX, where N equals the number of ports supported by the MAC and X equals the designated operating EPON MAC clocking rate. For example, a single instance of a MAC operating at 4× the clock rate supports 4 ports. This results in a nominal 75% area reduction of the EPON MAC. In addition, channelization can, in an alternate embodiment, be implemented by widening the data path to increase the bandwidth in addition to increasing the clock frequency.

FIG. 5 is a flow diagram illustrating one embodiment of channelization of packets and error correction (e.g., FEC blocks) for a PON MAC. In this embodiment, an EPON, for example a 10G EPON MAC OLT 500, is provided in accordance with the technology described herein. Packet channelization 501 commences with data packets flowing into PON MAC 502. Packet statistics are collected by Per Link Stats 503 connected to PON MAC 502. PON MAC 502 feeds the data packets to security (SEC) processor 504 where advanced encryption Standard 128b (AES-128) and/or China Telecom Triple Churning (Chrn) encryption 505 are used to encrypt the data packets. Please note, various known and future encryption methods are not outside the scope of the technology described herein. Data packets flow from security processor 504 to pack buffer layer 506 where data flow is scheduled based on buffer depth. FEC block channelization of the data packets 507 begins with PCS 508 providing descrambling (DeScr), decoding and time stamping of the data packets. FEC processing 509 includes reconciliation sublayer (RS (255,223)) 510 and is connected to FEC frame buffers 511-1 to 511-N, each corresponding to a separate EPON lane. Per lane processing 512 includes FEC frame buffers 511-1 to 511-N each fed to their respective framers 513-1 to 513-N and clocked by cross clock first in, first out (FIFOs) 514-1 to 514-N (from receiver (RX) cross clock 515). Please note that flow has been discussed in a single direction, but it is understood that this figure and associated discussion represents a bi-directional flow and processing.

FIG. 6 is a flow diagram illustrating an alternative embodiment for a channelized PON MAC wherein FEC block channelization of the data packets has been modified so that buffering occurs in per lane packet buffers. In this embodiment, an EPON, for example a 1G EPON MAC OLT 600, is provided in accordance with the technology described herein. Packet channelization 601 commences with data packets flowing into PON MAC 602. Packet statistics are collected by Per Link Stats 603 connected to PON MAC 602. PON MAC 602 feeds the data packets to security (SEC) processing 604 where advanced encryption Standard 128b (AES-128) and/or China Telecom Triple Churning (Chrn) encryption 605 are used to encrypt the data packets. Please note, various known and future encryption methods are not outside the scope of the technology described herein. FEC processing 606 includes reconciliation sublayer (RS(255,239)) 607 which connects to per lane 608 frame buffers 609-1 to 609-N, each corresponding to a separate EPON lane packet buffer 609-1 to 609-N (e.g., each corresponding to a 1 Gbps port) which are connected to PCS 610-1 to 610-N. And finally, per lane processing includes clocking by cross clocked first in, first out (FIFOs) 611-1 to 611-N (from receiver (RX) cross clock 612). Please note that flow has been discussed in a single direction, but it is understood that this figure and associated discussion represents a bi-directional flow and processing.

It should be understood that technology described herein can be implemented to include multimedia data pertaining to the exchange of voice, data, video, audio, messaging, graphics, others forms of media or any combination thereof.

The technology as described above provides many advantages. For example, by allowing per Logical Link Identifier (LLID) memory to be allocated across multiple ports, statistical multiplexing of the memory is achieved. This provides a single port with a full 2K LLID, while limiting the entire system to a smaller number (i.e., less than 4×2K).

The technology described herein can support high-density 10G EPON Optical Line Terminal (OLT) devices that support both asymmetric (10G/1G) and symmetric (10G/10G) operation, with support for 1G EPON coexistence. Applicable standards include, but are not limited to, IEEE 802.3av 10G EPON and IEEE 802.3ah 1G EPON, while additionally supporting the China CCSA-compliant 2.5G TURBO-EPON® mode. Multiple density configurations (e.g., 2×, 4×, and 8×10G ports) address a variety of MSAP/OLT line-card architectures, supporting both chassis-based and mini-OLT architectures at an optimal cost, footprint, and power per port The technology described herein can additionally support IEEE SIEPON P1904.1, China Telecom CTC 3.0 EPON, and Cable Labs DOCSIS Provisioning over EPON (DPoE) specifications, enabling system vendors to deploy software-compatible OLT line cards into both telephone and cable multiple system operator (MSO) markets, and reduce time-to-market and development time.

Throughout the specification, drawings and claims various terminology is used to describe the various embodiments. As may be used herein, the terms "channel" and "lane" are interchangeable. Also, as may be used herein, the terms "block" and "module" are interchangeable. The terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The technology as described herein has been described above with the aid of blocks illustrating the performance of specified functions and relationships thereof. The boundaries and sequence of these functional building blocks have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. One of average skill in the art will also recognize that the functional building blocks, and other illustrative blocks, modules and components herein, can be implemented as illustrated or by discrete components, application specific integrated circuits, processors executing appropriate software and the like or any combination thereof.

The technology as described herein may have also been described, at least in part, in terms of one or more embodiments. An embodiment of the technology as described herein is used herein to illustrate an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the technology as described herein have been expressly described herein, other combinations of these features and functions are likewise possible. The technology as described herein is not limited by the particular examples disclosed herein and expressly incorporates these other combinations.

The invention claimed is:

1. A method for channelizing a Passive Optical Network (PON) Media Access Controller (MAC) comprising:
   receiving network traffic data through a network switch;
   transmitting the network traffic data to one or more PON MAC(s) from the network switch; and
   increasing a clock rate of each of the one or more PON MAC(s) to channelize the one or more PON MAC(s) according to NX, where N>1 and equals a number of ports supported by each of the one or more PON MAC(s) and X equals a designated operating PON MAC clocking rate.

2. A method according to claim 1, wherein the channelizing of one or more PON MAC(s) includes error correction and encryption.

3. A method according to claim 2, wherein the encryption and the one or more PON MAC(s) are channelized on a per frame basis.

4. A method according to claim 2, wherein the error correction comprises Forward Error Correction (FEC) and the channelization occurs in multiple stages such that the Forward Error Correction (FEC) may be channelized on a per FEC code block.

5. A method according to claim 1, wherein the channelization occurs on a word, byte, or bandwidth basis.

6. A method according to claim 1, wherein the one or more PON MAC(s) are utilized within an Ethernet Passive Optical Network (EPON), Gigabyte Passive Optical Network (GPON) or a combination thereof.

7. A method according to claim 1, wherein the PON MAC is integrated within an Optical Line Terminal (OLT).

8. A system incorporating one or more channelized Passive Optical Network (PON) Media Access Controllers (MACs), the system comprising:
   a PON network switch;
   one or more channelized MAC(s) connected to the PON network switch, each of the one or more channelized MAC(s) supporting N channels, where N>1;
   one or more error correction modules connected to the one or more channelized MAC(s);
   a plurality of physical coding sublayers (PCSs) forming a PON lane comprising the N channels; and
   a serializer/deserializer (SERDES) interfacing with the PON lane.

9. A system incorporating one or more channelized Passive Optical Network (PON) Media Access Controllers (MACs), as per claim 8, wherein the one or more channelized MACs comprise at least a low-speed and a high-speed MAC connected to the PON network switch.

10. A system incorporating one or more channelized Passive Optical Network (PON) Media Access Controllers (MACs), as per claim 9, wherein the low-speed MAC comprises at least one 1G Ethernet Passive Optical Network (EPON) MAC and the high-speed MAC comprises at least one 10G EPON MAC.

11. A system incorporating one or more channelized Passive Optical Network (PON) Media Access Controllers (MACs), as per claim 8, wherein the one or more channelized MACs comprise any of, or a combination of one or more of: 1 Gbps Ethernet Passive Optical Network (EPON) MACs, 10 Gbps EPON MACs, Gigabyte Passive Optical Network (GPON), 2G MACs, XGPON 10G MACs, and AE P2P 10G MACs.

12. A system incorporating one or more channelized Passive Optical Network (PON) Media Access Controllers (MACs), as per claim 8, further comprising one or more encryption modules working in conjunction with the one or more error correction modules.

13. A system incorporating one or more channelized Passive Optical Network (PON) Media Access Controllers (MACs), as per claim 12, wherein the one or more encryption modules utilizes an Advanced Encryption Standard 128b (AES-128) and/or China Telecom Triple Churning (Chrn) Standard.

14. A system incorporating one or more channelized Passive Optical Network (PON) Media Access Controllers (MACs), as per claim 12, wherein encryption and the one or more channelized Passive Optical Network (PON) Media Access Controllers (MACs) are channelized on a per frame basis.

15. A system incorporating one or more channelized Passive Optical Network (PON) Media Access Controllers (MACs), as per claim 8, wherein the one or more channelized MACs further share common IP modules including, but not limited to: scheduling (SCH), dynamic bandwidth allocator (DBA) and statistics memory.

16. A system incorporating one or more channelized Passive Optical Network (PON) Media Access Controllers (MACs), as per claim 8, wherein the one or more error correction modules uses Forward Error Correction (FEC) and the channelization occurs in multiple stages such that the Forward Error Correction (FEC) may be channelized on a per FEC code block.

17. A system incorporating one or more channelized Passive Optical Network (PON) Media Access Controllers (MACs), as per claim 8, wherein the one or more channelized MAC(s) are utilized within an EPON, a Gigabyte Passive Optical Network (GPON) or a combination thereof.

18. A system incorporating one or more channelized Passive Optical Network (PON) Media Access Controllers (MACs), as per claim 8, wherein the one or more channelized MAC(s) are integrated within an Optical Line Terminal (OLT).

19. A multi-port Optical Line Terminal (OLT) incorporating one or more channelized Passive Optical Network (PON) Media Access Controllers (MACs) comprising:
   a PON network switch;
   one or more channelized MACs connected to the PON network switch, each of the one or more channelized MACs supporting N channels, where N>1;
   one or more error correction and encryption modules connected to the one or more channelized MACs;
   a plurality of physical coding sublayers (PCSs) forming one or more PON lane(s) comprising the N channels for each of the one or more channelized MACs; and
   a serializer/deserializer (SERDES) interfacing with each of the one or more PON lane(s).

20. A multi-port Optical Line Terminal (OLT) incorporating one or more channelized Passive Optical Network (PON) Media Access Controllers (MACs), as per claim 19, wherein the one or more channelized MACs comprise at least a low-speed and a high-speed MAC connected to the PON network switch.

* * * * *